(12) United States Patent
Bates et al.

(10) Patent No.: US 6,314,439 B1
(45) Date of Patent: *Nov. 6, 2001

(54) COMPUTER SYSTEM, PROGRAM PRODUCT AND METHOD OF CREATING ALIASES AND ACCESSING STORAGE LOCATIONS IN A COMPUTER SYSTEM WITH SAME

(75) Inventors: Cary Lee Bates; Paul Reuben Day, both of Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,934

(22) Filed: Feb. 6, 1998

(51) Int. Cl.[7] ................................................. G06F 17/24
(52) U.S. Cl. .............................................. 707/513; 707/501
(58) Field of Search ..................................... 707/501, 513

(56) References Cited

U.S. PATENT DOCUMENTS

| | | | |
|---|---|---|---|
| 5,862,325 | * | 1/1999 | Reed et al. ............................ 709/201 |
| 5,918,237 | * | 6/1999 | Montalbano ........................... 707/513 |
| 5,924,108 | * | 7/1999 | Fein et al. ............................. 707/531 |
| 5,937,163 | * | 8/1999 | Lee et al. ......................... 395/200.48 |
| 5,937,404 | * | 8/1999 | Csaszar et al. ........................... 707/9 |
| 5,961,602 | * | 10/1999 | Thompson et al. ................... 709/229 |
| 5,963,964 | * | 10/1999 | Nielsen ................................. 707/501 |
| 5,978,818 | * | 11/1999 | Lin ....................................... 707/501 |
| 5,983,190 | * | 11/1999 | Trower, II et al. ................... 704/276 |
| 5,983,244 | * | 11/1999 | Nation ................................. 707/501 |
| 6,003,048 | * | 12/1999 | Fallside ................................ 707/513 |
| 6,009,441 | * | 12/1999 | Mathieu et al. ...................... 707/516 |
| 6,032,162 | * | 2/2000 | Burke ................................... 707/501 |
| 6,037,934 | * | 3/2000 | Himmel et al. ...................... 345/335 |
| 6,208,995 | * | 3/2001 | Himmel et al. ...................... 707/104 |
| 6,211,871 | * | 4/2001 | Himmel et al. ...................... 345/335 |

OTHER PUBLICATIONS

Guildford, E., Netscape Communicator 6–in–1, QUE, Macmillan Comp. Pub., p. 29–32.*
Microsoft Internet Explorer 3.0 screendumps, Figs. 1–3, 1996.*

* cited by examiner

Primary Examiner—Heather R. Herndon
Assistant Examiner—Cesar B. Paula
(74) Attorney, Agent, or Firm—Wood, Herron & Evans, L.L.P.; Roy W. Truelson

(57) ABSTRACT

A computer system, program product and method implement enhancements to the functionality and power of aliases in accessing documents stored in a computer system. An alias may be automatically or manually generated and/or later refreshed based upon content data retrieved from a document that is stored at a predetermined storage location. An alias generated based upon such content data may also be displayed on the computer system. The content data is retrieved in conjunction with the retrieval of a portion of the document, and is defined to exclude the title data for a document. In addition, multiple aliases may be associated with a predetermined storage location. The multiple aliases may be selectively displayed in lieu of one another on a computer system, with the display of a second alias replacing the display of a first alias. Furthermore, the multiple aliases may be stored with one another in an alias group data structure that includes a single location identifier associated with each of the aliases.

21 Claims, 7 Drawing Sheets

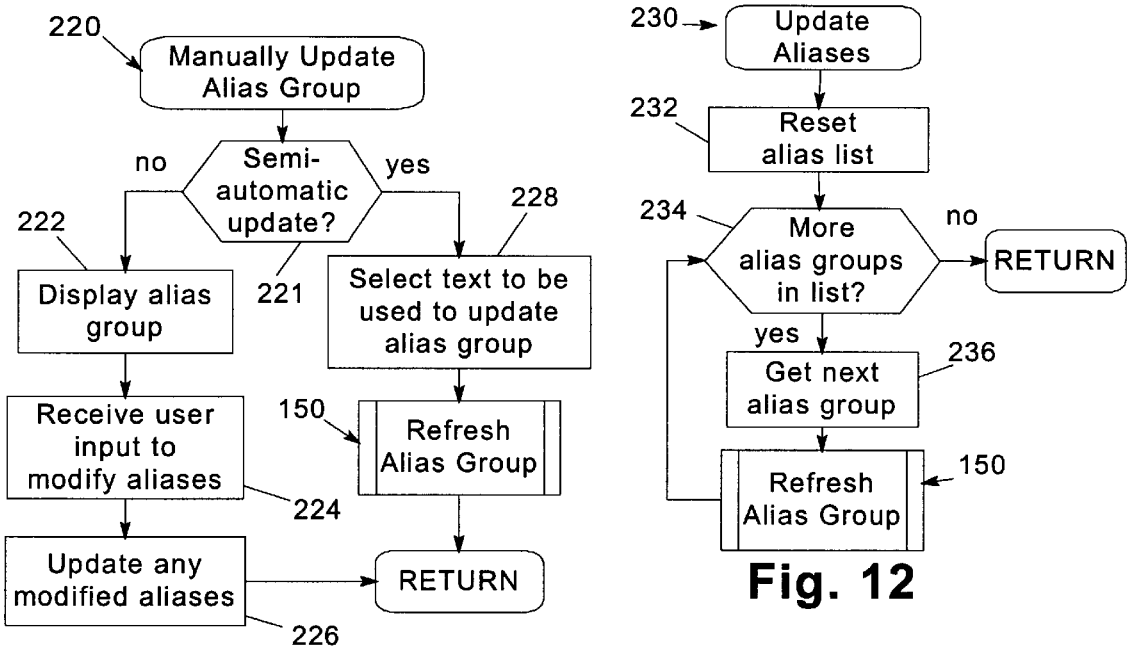
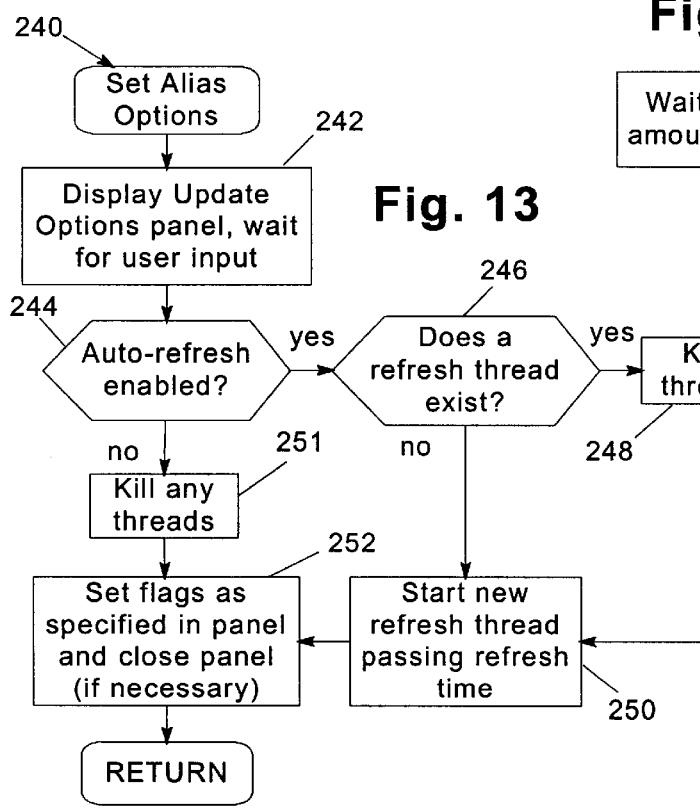
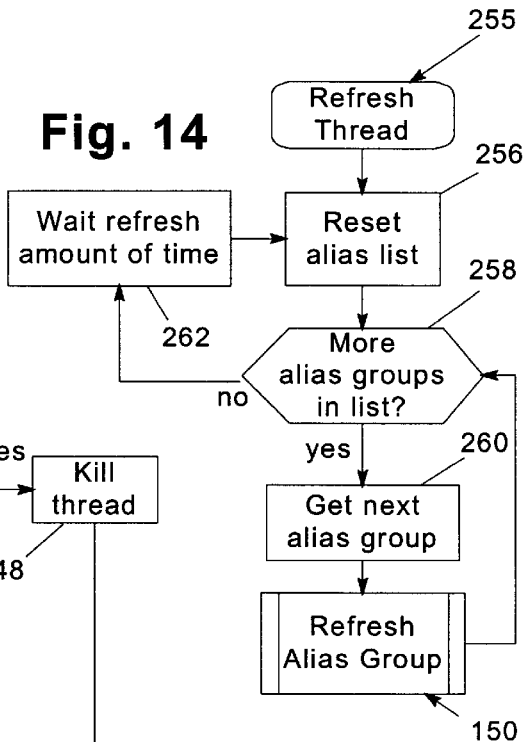

COMPUTER SYSTEM, PROGRAM PRODUCT AND METHOD OF CREATING ALIASES AND ACCESSING STORAGE LOCATIONS IN A COMPUTER SYSTEM WITH SAME

FIELD OF THE INVENTION

The invention is generally related to computers and computer software. More specifically, the invention is generally related to a manner of aliasing predetermined storage locations in a computer system.

BACKGROUND OF THE INVENTION

Information is typically stored and accessed on a computer system using an "address" that identifies where in the computer system the information can be found. For public networks such as the Internet, an identifier known as a Uniform Resource Locator (URL) is used to identify the address of a particular document. A URL typically includes a protocol identifier coupled to a domain identifier and optionally a filename and specifying where in the domain the document is stored. Moreover, a specific location in a document may also be included in a URL. Due to all of this information, however, a URL can be quite complex for some documents, which makes it difficult for a user to remember URL's of previously-viewed locations, not to mention to type the URL's in the computer even if they are remembered.

As a result, many web or hypertext browsers—the computer applications that are typically used to view documents stored on the Internet—employ aliasing to facilitate user access to previously-viewed documents. Aliases, which are often referred to as bookmarks, favorites, or shortcuts, typically include a unique word or phrase that a user can access to recall a document stored at a predetermined storage location (e.g., as identified by a URL). Aliases are typically maintained in drop-down menus that can be selected by a user to retrieve a particular document, thereby eliminating the need for a user to type in a document's URL to retrieve the document.

Conventional web browsers enable a user to create, or add, aliases to an alias list. Typically, in response to an "add" request for a particular document being viewed, an alias is created with a location identifier pointing to the URL for the current document, and with an alias identifier that is generated from the title for the document. Given that a significant portion of the information stored on the Internet is found in hypertext documents formatted using a standard language known as the Hypertext Markup Language (HTML), many browsers access an HTML tag known as a title tag to obtain the initial alias identifier for a document alias. A title tag, which has the format "<title> . . . </title>", is principally used by a web browser to provide a short title that is typically displayed in the title bar of a web browser when the document is being viewed.

After initial creation of an alias, a user is often permitted to manually edit the alias identifier for an alias so that a custom identification of a document may be created by any user. Conventional browsers also permit aliases to be grouped together in folders to facilitate location of a particular alias in a list.

As many users "surf the net", they tend to create a large number of aliases along the way, often resulting in the creation of large and cumbersome alias lists. As the number of aliases in a list rises, it becomes more difficult to locate particular aliases, and can induce users to select the wrong alias by mistake. Given the increasing bottlenecks and delays that can be experienced while surfing the Internet, any navigation to incorrect locations can be time consuming and frustrating for many users.

A number of significant drawbacks that exist with conventional browsers only serve to aggravate the situation. For example, by creating aliases based upon the information stored in a title tag for a document, the quality of an automatically generated alias identifier is wholly dependent upon the quality of the title created by the author of the document. Since the primary purpose of the title is unrelated to aliasing, titles are often inadequate to uniquely identify documents, thereby nullifying the benefit of such automatically generated aliases in the first place. While a user can manually override an alias identifier, the user is left to create their own phrase that will later trigger their memory as to the contents of the document. This additional user effort often detracts from the user's other tasks and decreases productivity.

Another difficulty with conventional browsers is that the alias identifiers enabled by many browsers are limited to simple alphanumeric phrases of only a few words at the most. Particularly when a user has created aliases for many documents related to a particular subject, it can become difficult for a user to create a unique identifier for each and every document.

Therefore, while conventional aliasing techniques can provide some assistance to users when navigating with web browsers and the like, there is a great deal of room for advancement in these techniques so that additional user benefits can be realized.

SUMMARY OF THE INVENTION

The invention addresses these and other problems associated with the prior art by providing a computer system, program product and method that implement a number of unique enhancements to the functionality and power of aliases in accessing documents stored in a computer system. Consistent with one aspect of the invention, an alias may be automatically or manually generated and/or later refreshed based upon content data retrieved from a document that is stored at a predetermined storage location. An alias generated based upon such content data may also be displayed on the computer system. The content data is retrieved in conjunction with the retrieval of a portion of the document, and is defined to exclude the title data for a document. While title data may also be utilized in conjunction with the content data when generating the alias, this configuration differs significantly from conventional manners of generating an alias where only title data is typically used.

Among other data, the content data retrieved from a document may include a multimedia object that is associated with the alias so that multimedia object may be viewed by a user to determine whether it is desirable to retrieve the document associated therewith. The content data may also include a number of frequently-occurring words that may be retrieved and analyzed, typically with the most frequently-occurring words used as the alias for the document. The content data may also include a block of information that is specifically selected by a user, as well as sets of headings that are embedded in a document, so that this information may be used directly as an alias for the document. Moreover, the content data may include specific tags that are embedded in a document by the author thereof to provide specific information that can be used to generate what the author feels is a particularly relevant alias for the document.

Consistent with another aspect of the invention, multiple aliases may be associated with a predetermined storage location. The multiple aliases may be selectively displayed in lieu of one another on a computer system, with the display representation of a second alias replacing the display representation of a first alias. Furthermore, the multiple aliases may be stored with one another in an alias group data structure that includes a single location identifier associated with each of the aliases.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 11 is a flow chart illustrating the program flow of the manually update alias group routine of FIG. 5.

FIG. 12 is a flow chart illustrating the program flow of the update aliases routine of FIG. 5.

FIG. 13 is a flow chart illustrating the program flow of the set alias options routine of FIG. 5.

FIG. 14 is a flow chart illustrating the program flow of the refresh thread routine called in FIG. 13.

DETAILED DESCRIPTION

The embodiments described hereinafter may be used to enhance the ability of a user to create and maintain effective aliases for storage locations on a computer system. An alias, which is also often referred to as a bookmark, a favorite, or a shortcut, typically provides an alternate and more descriptive identification of a storage location. The storage location may be internal to a workstation or other single-user computer, e.g., a filename and/or path for a particular document or file stored thereon. In the alternative, the storage location may be external to a workstation, e.g., as stored on a network server, e.g., over a private LAN or WAN, or over a public network such as the Internet. As such, the storage location may be identified by an address in the form of a Uniform Resource Locator (URL), the format of which is well known in the art. However, it should be appreciated that the invention may also be used in aliasing other locations of information within or outside of a particular computer system.

The herein described embodiment also provides aliases for documents stored in HTML format, which is a predominant format used for Internet documents. However, it should be appreciated that the invention may also be utilized with other document and file formats as well.

Prior to discussing specific embodiments of the invention, a brief description of exemplary hardware and software environments for use therewith is provided.

Hardware Environment

Figure 1:
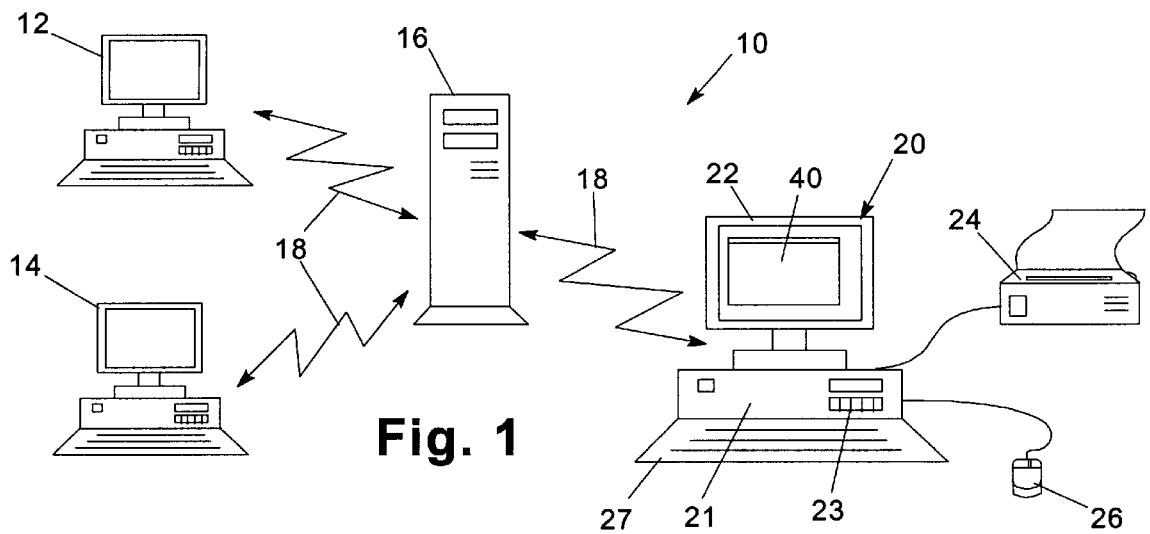
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. For example, one such computer software application is a hypertext browser, a window 40 of which is displayed on computer display 22. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
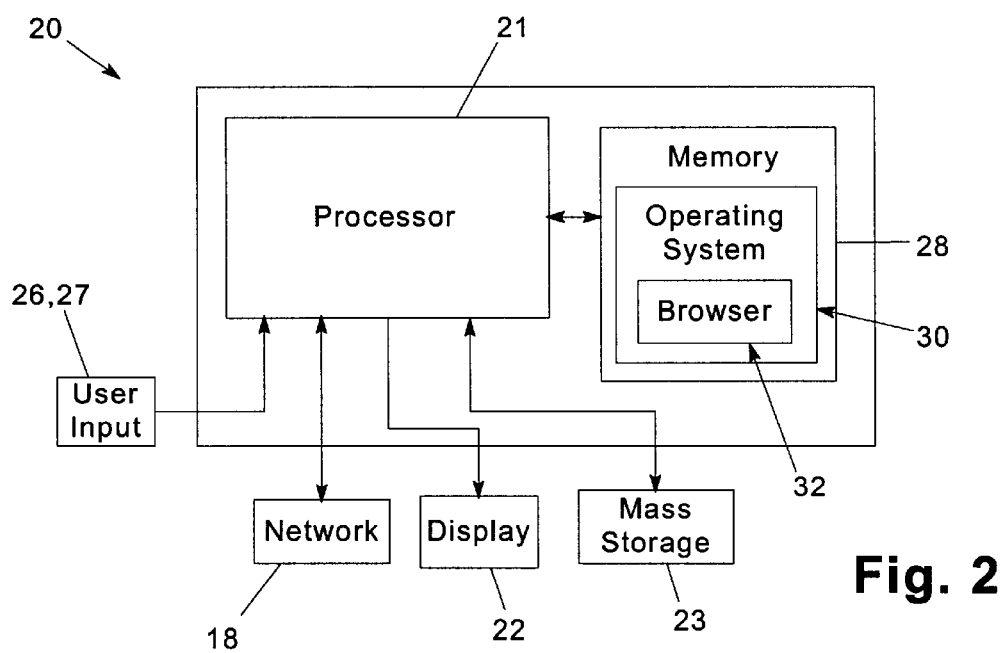
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An operating system 30 is illustrated as resident in memory 28, and executing within this operating system is illustrated a hypertext browser 32. However, it should be appreciated that browser 32 may be stored on network 18 or mass storage 23 prior to start-up, and in addition, may have various components that are resident at different times in any of memory 28, mass storage 23, network 18, or within registers and/or caches in processor 21.

Browser 32 processes hypertext documents for viewing. The hypertext documents may be retrieved from mass storage 23 or over network 18, e.g., through an Internet connection. Moreover, hypertext documents may be cached from time to time in the memory 28 and/or mass storage 23 once they are viewed to accelerate subsequent viewing by a user.

It should be appreciated that other software environments may be utilized in the alternative.

Alias Enhancements

In the preferred embodiment of the invention, aliases are maintained in "alias groups" that function as collections of aliases that identify a particular storage location in a computer system. As such, multiple aliases may be grouped into a single data structure that permits both a simultaneous view of all aliases for a particular location, as well as singular views of particular aliases for a location. However, it should be appreciated that several enhancements described hereinafter may be utilized with aliases that are stored and utilized singularly, and thus, it is not required that aliases be stored or accessed in alias groups. It should also be appreciated that any usages of alias groups, alias group data structures, etc., as described herein may be modified for usage with single aliases and alias data structures consistent with the invention, and thus, the terms "alias" and "alias group" may be used interchangeably in some circumstances.

Figure 3:
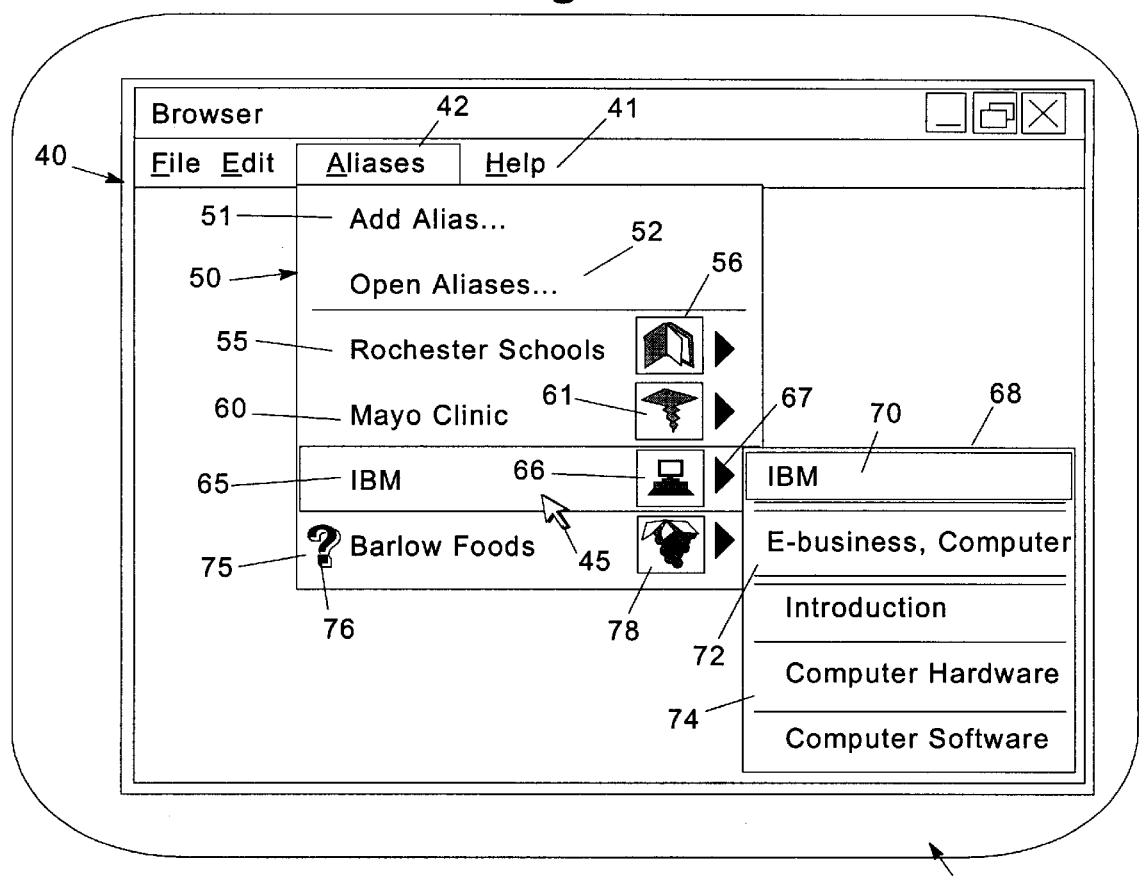
FIG. 3 is a block diagram of the computer display of FIG. 1, within which is displayed a list of aliases consistent with the invention.

As shown in FIG. 3, for example, a window 40 for browser 32 includes a menu bar 41 with an "alias" heading 42, corresponding to a bookmark or favorites menu (e.g., as used in many conventional browsers such as Navigator from Netscape Communications and Internet Explorer from Microsoft Corporation). Selection of heading 42 results in a drop-down alias menu 50 being displayed. Menu selections, e.g., an "add alias" selection 51, an "open aliases" selection 52, and alias selections 55, 60, 65 and 75, are provided for menu 50. User selection of selection 51 typically results in the creation of an alias group for the location of the current document displayed in the browser window. User selection of selection 52 typically results in a separate alias window being opened to display all of the alias groups stored in the browser. Typically, such a window permits additional alias management functions to be performed, e.g., deleting and editing aliases, creating and managing folders therefor (if so supported), etc.

User selection of any of alias selections 55, 60, 65 and 75 results in navigation to the location identified thereby—typically resulting in the document stored at that location being loaded into the browser. Moreover, merely by placing a mouse pointer 45 over a particular alias selection (e.g., alias selection 65), all of the aliases stored in a particular alias group represented by that selection are displayed in a separate menu (e.g., menu 68). In the alternative, placing focus on a menu selection may open a "bubble-help" window anchored off the pointer.

Additional user interactions with menus 50 and 68 will be discussed in greater detail below. Moreover, it should be appreciated that other alias management functionality may be implemented in either menu consistent with the invention. Furthermore, it should be appreciated that the principles of the invention may also apply to other alias implementations, e.g., the favorites explorer bar provided in Version 4.0 of the Microsoft Internet Explorer web browser, among others.

Typically, each alias group is represented on menu 50 by a current or active alias therefrom that functions as the alias selection for the alias group. It is anticipated that the user may be permitted to modify the active alias for a group, e.g., by right-clicking on the selection (i.e., depressing the right mouse button while pointer 45 is disposed over the selection). In the alternative, right-clicking on a selection may open a pop-up menu that provides additional management features for the alias group, e.g., modifying the current alias, deleting the alias group, updating the alias group, and modifying the alias group, among others.

Each alias selection presented on menu 50 may include an inactive status indicator such as indicator 76 for selection 75. The indicator provides an indication to the user that an update operation on the alias group was unsuccessful because the document stored at the location identified by the alias group could not be retrieved—indicating a possible broken link or stale reference. Each alias selection may also include a graphic image alias (e.g., images 56, 61, 66 and 78 which are respectively displayed for selections 55, 60, 65 and 75) that provides a further descriptive indicator for a particular location. A single image may be associated with an alias group, or multiple images may be associated with a group, whereby an active image could be selected for a group in the same manner as an active alias is selected. In the alternative, graphic image aliases may be displayed in lieu of text aliases. It should also be appreciated that multimedia objects other than graphic images could also be utilized as aliases, e.g., animation clips, audio clips, video clips, etc.

An alias group menu, e.g., menu 68 for the alias group represented by alias selection 65, includes a display of each alias provided in the alias group, e.g., aliases 70, 72 and 74.

Alias 70 represents a title-type alias, which typically includes an alphanumeric string alias identifier that is either manually entered by a user, or that is automatically retrieved from a document, e.g., from the title tag therefor or from a specific alias tag embedded in the document (discussed in greater detail below). Alias 72 represents a word-type alias, which typically includes a list of frequently-occurring and non-common words and/or phrases found in a document. Alias 74 represents a heading-type alias, which typically includes a list of section headings found in a document. If a plurality of any particular type of alias is provided in an alias group, it should be appreciated that such aliases may be presented in the same line of the menu, on different lines of the menu (e.g., as shown for each alias 74), or via a separate pop-up or drop-down menu, among other alternatives. It should also be appreciated that an alias may be considered to include a plurality of entries, e.g., where all headings in a document or all frequently-occurring words are jointly considered to be single aliases. In the alternative, a group of entries may be defined as separate aliases, e.g., where each word in a word-type alias is considered a separate alias.

Figure 4:
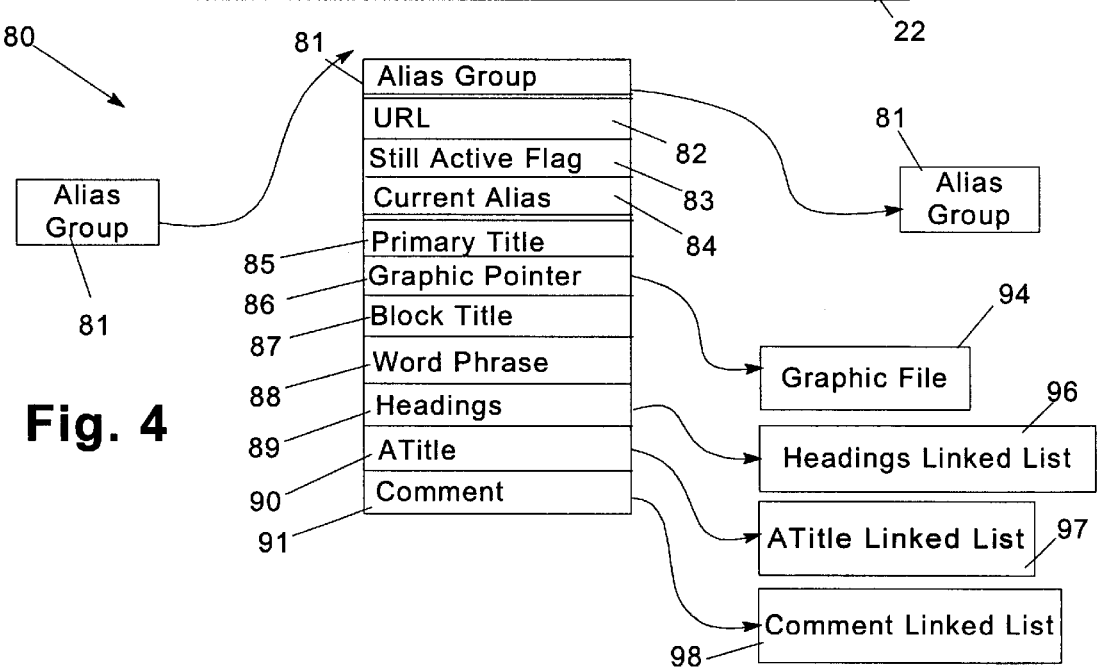
FIG. 4 is a block diagram of an alias list data structure consistent with the invention.

FIG. 4 illustrates one suitable alias list data structure 80 for maintaining a set of alias groups. Data structure 80 is implemented as a linked list of alias group data structures 81. Each alias group data structure, in turn, forms an alias group record. One field, or slot, in each record is a location identifier field 82 that stores the location associated with the alias group, e.g., in a URL format. Another field 83 stores a "still active" flag that indicates whether the alias is still valid. Another field 84 provides an indication of the current alias for the alias group—that is, the alias to display in menu 50.

Various aliases in alias group 81 are identified at 85–91. Field 85 stores the primary title for the alias group—typically the text disposed within the title tag for the associated document. Another field 86 stores a pointer to a graphic file 94, representing a multimedia object alias. Field 87 stores a block title alias, which is an alias delimited by tags disposed around a section of a document. The alias is not displayed, but may be added as an alias if a block title option is selected and the pointer is positioned within the section enclosed by the tags. Field 88 includes a word-type alias including a phrase of a plurality of frequently-occurring words.

Field 89 includes a pointer to a linked list 96 of heading aliases. Field 90 includes a pointer to a linked list 97 of ATitle aliases. Field 91 includes a pointer to a linked list 98 of comment aliases. Within each linked list is at least one alias identifier mapped to the location identifier for the group. In addition, each element of the ATitle list 97 is also associated with an index value (discussed below).

It should be appreciated that any of fields 85–91 may be provided independent of one another in an alias group, and that any of the types of aliases may be stored in linked lists (e.g., like aliases 89–91) or individually (e.g., like aliases 85–88). Other fields may also be provided to support other alias types.

Moreover, any number of alternative data structure arrangements may be used consistent with the invention, e.g., where alias identifiers are stored directly in the record fields, among other variations. However, to minimize the storage space required for the storage of aliases (particularly graphic or other multimedia object aliases), it may often be desirable to store pointers in the data structure and maintain such aliases in separate files or caches. Other modifications will be apparent to one of ordinary skill in the art.

Figure 5:
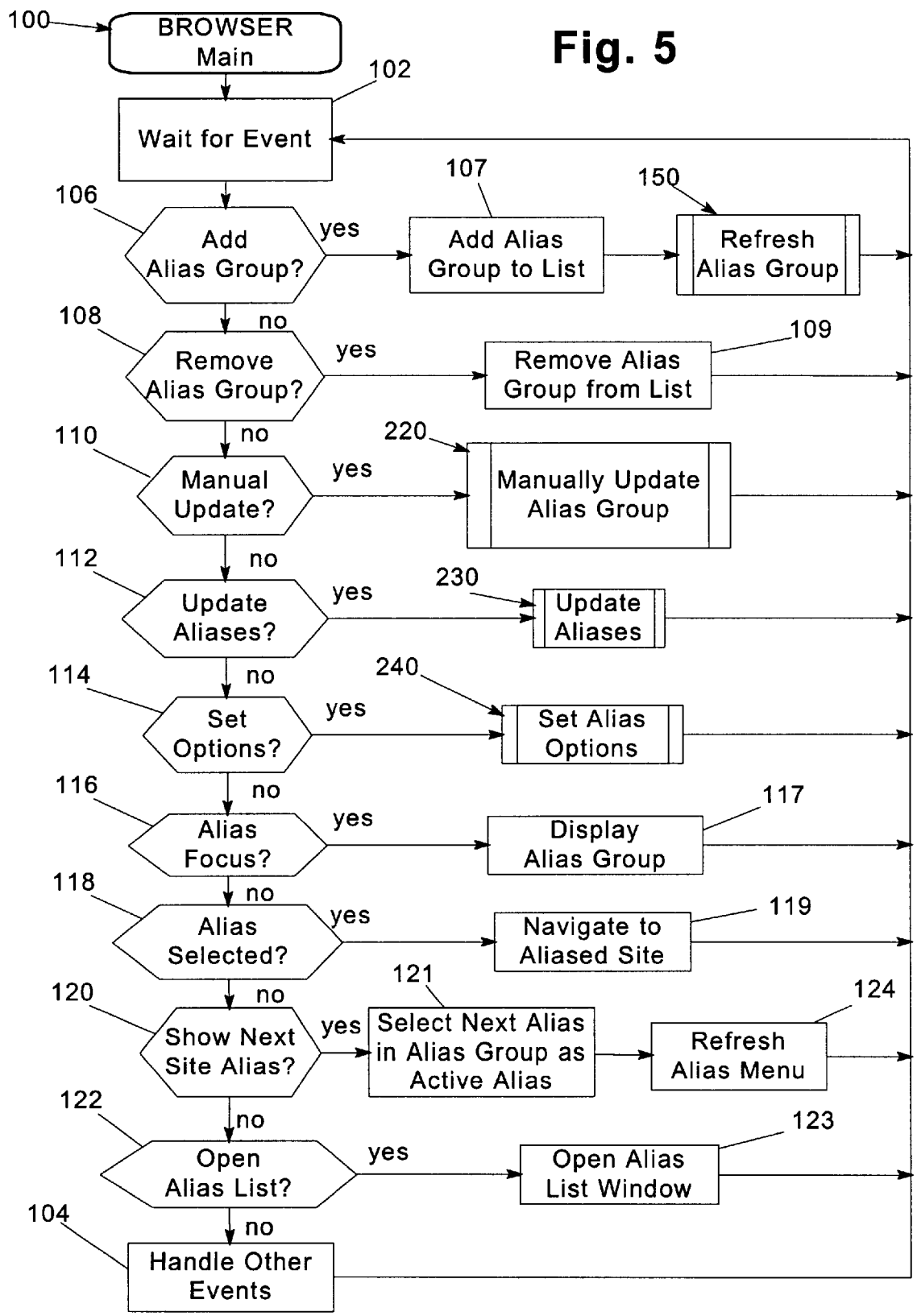
FIG. 5 is a flowchart illustrating the program flow for the main routine of a browser consistent with the invention.

FIG. 5 illustrates the program flow of a main routine 100 for browser 32. Routine 100 is disclosed as an event-driven system, whereby system events are waited for by browser 32 in block 102 and handled as they are received. A number of such events are detected by blocks 106, 108, 110, 112, 114, 116, 118, 120 and 122 and are handled in the manners described hereinafter. Other events that are not relevant to the invention are handled in a conventional manner as shown in block 104. It should be appreciated that, in general, other manners controlling the program flow in a computer software application may be used in the alternative, e.g., procedural-based systems, among others. Therefore, the invention should not be limited solely to event-driven systems.

A first event, detected in block 106, is an add alias group event. This event, which may be initiated in response to user selection of selection 51 of menu 50, as well as through a tool bar button, control key sequence, or pop-up menu, among others, represents a user's request to create a new alias group for the current document displayed by browser 32. In response to this event, block 107 is executed to add a new alias group to the list representing the current document. Addition of an alias group typically includes creating a new alias group record and inserting it into the alias group linked list, the implementation of which is well-known in the art. In addition, a refresh alias group routine 150 is called to automatically generate alias data for the new alias group (discussed below in connection with FIG. 6).

Another event handled by routine 100 is a remove alias group event, which is detected at block 108. In response to this event, block 109 is called to remove the alias group from the list, typically by removing the data structure therefor from the linked list of alias groups, in a manner well-known in the art. The remove alias group event may initiated in any number of manners, e.g., from an alias list window, a pop-up menu, etc.

A number of additional events, including a manual update event, an update aliases event, and a set options event, are detected respectively by blocks 110, 112 and 114. Each event is, in turn, respectively handled by a separate dedicated routine, manually update alias group routine 220 for the manual update alias event, update aliases routine 230 for the update aliases event, and set alias options routine 240 for the set options event (each discussed in greater detail below). Each of these events may be initiated in any number of manners, e.g., through drop-down or pop-up menus, among others.

Another event handled by routine 100 is an alias focus event, which is detected at block 116 and is initiated in response to the movement of the pointer by a user such that the pointer is disposed over a particular alias selection in menu 50. In response to this event, block 117 is executed to display the alias group corresponding to the focused selection. For example, as illustrated in FIG. 3, menu 68 is displayed on display 22 in response to pointer 45 being disposed over selection 65.

Displaying an alias group typically includes opening a suitable panel and rendering some or all of the alias identifiers stored in the highlighted alias group. In a conventional graphical user interface (GUI) environment, for example, display of an alias group would be handled by opening a menu panel, stepping through each alias identifier in the alias group, building display lines therefrom and adding such lines to the menu panel, all of which arc operations that are understood in the art. Individual alias identifiers may be displayed on separate lines, or may be grouped together on the same line as desired. For example, menu 68 is implemented with the alias identifiers of each predetermined type displayed on separate lines and separated by double line partitions (FIG. 3). Alias identifiers of the heading-type aliases are shown on separate lines at 74 separated by single line partitions to emulate a table of contents or outline. The heading-type alias identifiers may also be horizontally arranged relative to one another to illustrate any hierarchical relationship between such headings. Given the wide variety of display alternatives available for presenting the aliases in an alias group, however, the invention should not be limited to this specific display implementation.

Another event handled by routine 100 is an alias selected event, which is detected at block 118 and is initiated in response to a user selecting one of the selections in menu 50. Selection is usually performed via movement of the mouse pointer over a particular selection and depressing a mouse button, among others. In response to this event, block 119 is executed to navigate to the alias site, in a manner well-known in the art. Typically, navigation results in the browser displaying the document stored at the URL for the selected alias group.

Another event handled by routine 100 is a show next alias event, which is detected in block 120, and which may be initiated in any number of manners, e.g., by right-clicking on a selection in menu 50. In response to this event, block 121 is executed to select as the current alias the next alias in the alias group represented by the selected selection—typically by storing the new current alias in slot 84 of the alias group data structure. Next, block 124 is executed to refresh the alias menu, which has the result of updating the menu to display another alias as the selection for that alias group. Moreover, as discussed above, a similar event may be handled for selecting between a number of graphic images or other multimedia objects for a given alias group. The order in which aliases are arranged for sequential presentation in menu 50 may vary in different implementations. For example, in one implementation, the next alias to display may be obtained by proceeding to the next item in a linked list from the previous current alias (if any), and if no item exists (or if the current alias is not stored in a linked list), proceeding to the next field in the alias group. Also, if the next field is a linked list, the first entry therein is then selected as the current alias.

It should be appreciated that, by right-clicking on an alias selection, a display representation of one alias from an alias group is replaced by a display representation of another alias. The display representations, which are typically generated by a window manager when rendering menu 50, therefore change, although no change in the actual aliases occurs.

Another event handled by routine 100 is that of an open alias list event, which is detected at block 122 and is initiated in any number of manners, e.g., by user selection of selection 52 in menu 50, among others. In response to this event, block 1123 is executed to open an alias list window, which is similar in many respects to a bookmark or favorites window utilized in a number of conventional browsers to permit more detailed management of aliases.

It should be appreciated that additional events may be handled by routine 100 consistent with the invention.

Figure 6:
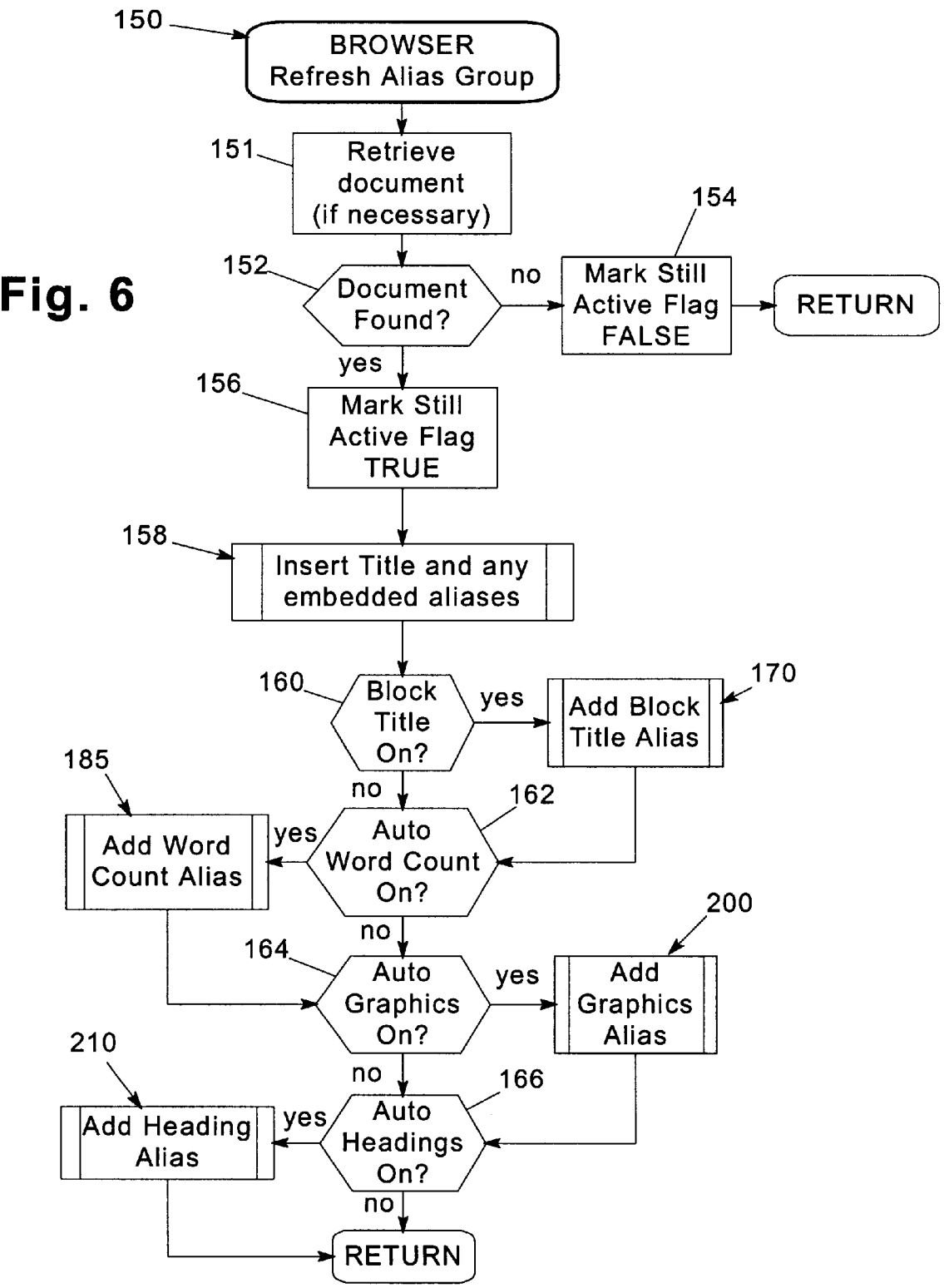
FIG. 6 is a flow chart illustrating the program flow of the refresh alias group routine of FIG. 5.

FIG. 6 illustrates refresh alias group routine 150 in greater detail. Routine 150 typically operates by analyzing content data from a document to generate aliases therefor. Content data may be considered to include any data from a document that is not specifically designated as title data, e.g., for HTML documents, data that is not specifically delimited by title tags ("<title>" and "</title>"). While additional data, including title data, may also be used to generate aliases in conjunction with the content data retrieved from a document, the use of such non-title content data has been found to provide significant advantages (which will become apparent below) over conventional alias generation methods that rely solely on title data.

Routine 150 begins in block 151 by attempting to retrieve the document stored at the URL identified in the location identifier for the alias group. It should be appreciated, however, that in many instances (e.g., when adding a new alias group), the document will already be retrieved by the browser, and thus, block 151 may be by-passed if it is detected that the document is already in memory. Also, it may be possible that only a portion of a document need be retrieved (e.g., if it is known that alias tags will always be located at the beginning of a document, for example).

Next, block 152 determines whether the attempt to retrieve the document was successful. If the document could not be retrieved, it is possible that the link is no longer valid, and thus, control is diverted to block 154 to mark the still active flag for the alias group to FALSE (which will result in an inactive status indicator such as indicator 76 being displayed adjacent the active alias for the alias group in menu 50 (FIG. 3)). Routine 150 is then terminated.

If, however, the document has been found, control is passed from block 152 to block 156 to mark the still active flag as TRUE (which inhibits display of an inactive status indicator for the alias group). Next, a routine 158 is executed to insert the title and any embedded aliases from the document into the alias group data structure.

As discussed above, similar to many conventional browsers, an alias may be generated from an HTML document by retrieving the text between the "<title>" and "</title>" tags that are conventionally used for displaying text in the title bar of the browser window. In addition, consistent with the invention, it may be desirable to extend the HTML protocol to include one or more new tags specifically designated for use in identifying additional aliases for a document.

For example, one suitable additional tag is a bracket tag, or "ATitle" tag, that allows for bracketing text that is displayed in the document for further use as an alias for the document. The text between the bracket tags forms an alias identifier from which the alias is created. In addition, it may be desirable to include a tag identifier in each tag to permit multiple aliases to be generated in the document, yet enable single aliases to be constructed by appending together multiple alias identifiers delimited by alias tags with the same tag identifiers. For example, one suitable type of bracket tag to delimit an Nth title-type alias could be "<atitleN>" and "</atitleN>", although other tag configurations could be used in the alternative. Also, the tag and alias identifiers for a tag could be supplied as separate fields in the tag.

Another type of alias tag is a comment or hidden tag, whereby the text disposed between a pair of tags is used as an alias identifier, but is treated as a comment and is not displayed in the document. One suitable format for a comment tag could be "<!ATitle>" and "</!ATitle>", for example.

It should be appreciated that other types of aliases may be embedded in a document so that the author of the document may tailor the alias generation process as he or she sees fit. For example, graphic aliases may be also be embedded in a document, e.g., by supplying the actual graphics information or pointing to a graphics file stored at a different location. It is possible for bracket and comment tags to also pull in graphics, however, a separate graphics tag would provide a friendly syntax for explicitly separating graphics into separate tables, as well a naming convention to assist system functions. In addition, graphics within a bracket or comment alias may be filtered out in some systems, whereby a separate graphics alias tag would let the originator have greater relative control over alias generation. For example, one suitable format for a graphics alias tag would be "<atitleNg>" and "</atitleNg>", among others.

Figure 6A:
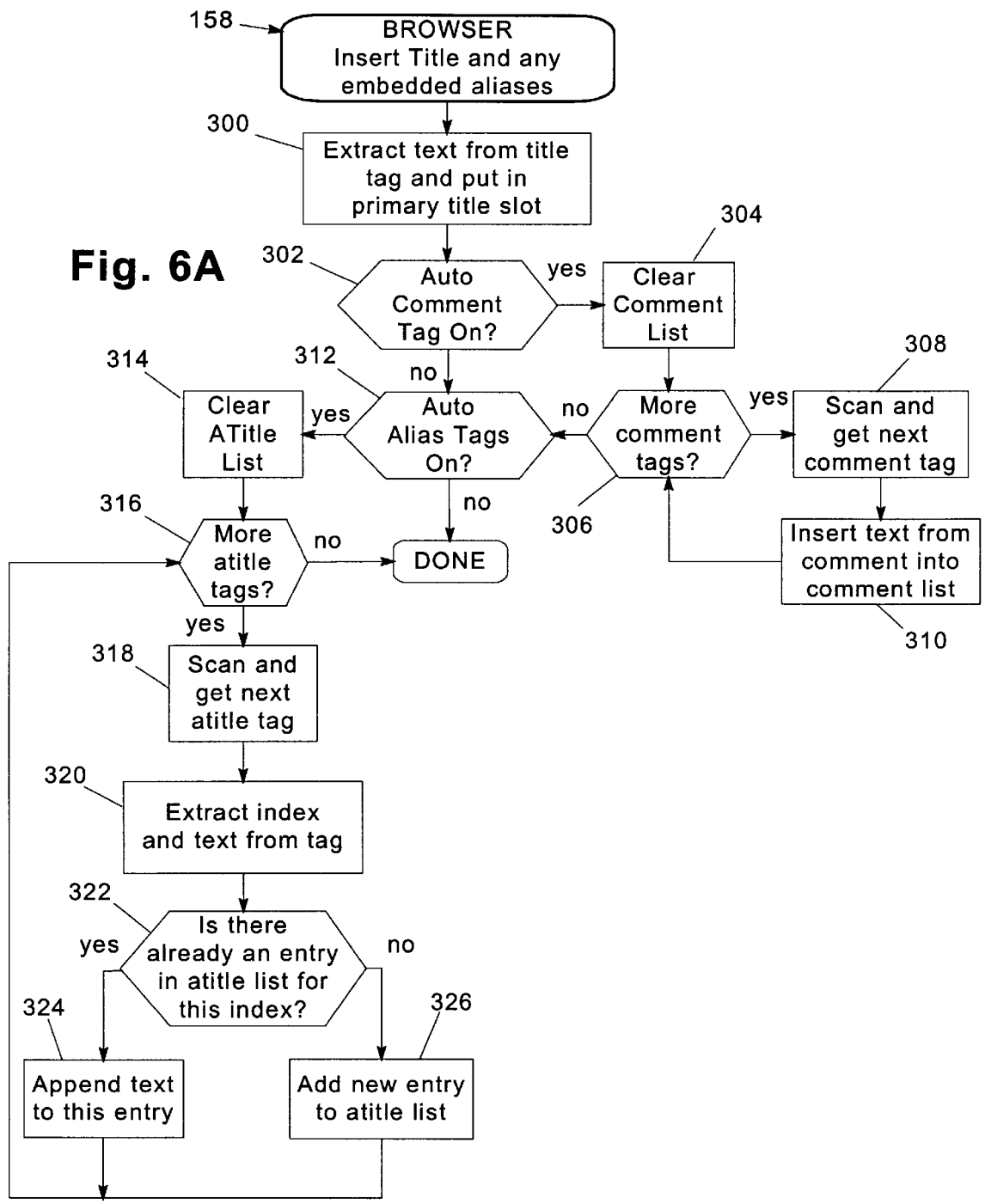
FIG. 6A is a flow chart illustrating the program flow of the insert title and any embedded aliases routine of FIG. 6.

Routine 158 is illustrated in greater detail in FIG. 6A. The routine begins at block 300 by extracting the text from the title tag (if any) and placing the text in the primary title slot 85 of the alias group data structure. Next, block 302 determines whether an "auto comment tag" option has been selected—that is, whether the user has configured the system to automatically retrieve comment tags from the document when generating an alias group. If not, control passes to block 312. If, however, the option is selected, control passes to block 304 to clear comment linked list 98. Next, a loop is initiated in block 306 that processes each comment tag in the document by first scanning the document and retrieving each comment tag in block 308 and then inserting in block 310 the text as the next entry in comment linked list 98. Once each comment tag has been processed, control then passes to block 312.

Block 312 determines whether an "auto alias tag" option has been selected—that is, whether the user has configured the system to automatically retrieve alias (bracket) tags from the document when generating an alias group. If not, routine 158 is terminated. If, however, the option is selected, control passes to block 314 to clear ATitle linked list 97. Next, a loop is initiated in block 316 which processes each ATitle tag in the document by first scanning the document and retrieving each ATitle tag in block 318 and then extracting the text and index (or tag) identifier from the tag in block 320. Next, block 322 determines whether an entry already exists in ATitle list 97 having the same index as that retrieved from the currently-processed ATitle tag. If so, the text from the tag is appended to the end of the existing entry in block 324. If not, a new entry is added to the list in block 326, including the text extracted from the tag as the alias identifier therefor. Upon completion of either block 324 or block 326, control returns to block 316 to process additional ATitle tags. Once each ATitle tag has been processed, routine 158 is terminated.

Returning to FIG. 6, upon completion of block 158, a series of decision blocks 160, 162, 164, and 166 are executed to determine whether several additional optional manners of automatically generating aliases for a document are enabled by the current configuration of the system. In particular, each of the word, graphics and headings-type aliases may be automatically generated by the browser if such operations are enabled based upon user configuration of the browser. It should be appreciated however that the automatic generation of any type of alias may be a configureable option or a mandatory operation as desired.

For block title-type aliases, a"block title" option is checked at block 160 and handled by an add block title alias routine 170 (discussed in greater detail below). If the block title option is not enabled, or upon completion of routine 170, blocks 162, 164 and 166 are next executed in sequence to determine whether the automatic generation of word, graphics and headings aliases should be performed. If an auto word count option is enabled, block 162 calls an add word count alias routine 185. If the auto graphics option is enabled, block 164 calls an add graphics alias routine 200. In addition, if the auto headings option is enabled, block 166 calls an add headings alias routine 210. After each of blocks 160–166 have been executed, routine 150 is then complete.

Figure 7:
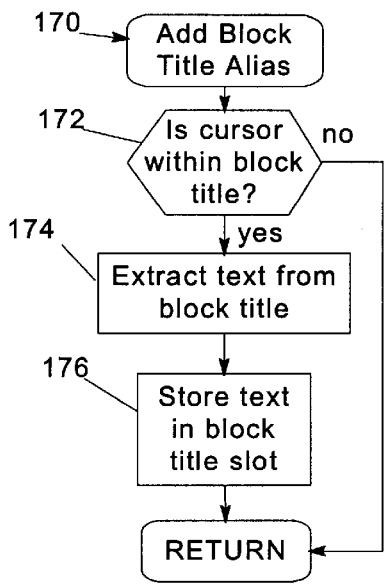
FIG. 7 is a flow chart illustrating the program flow of the add block title alias routine of FIG. 6.

FIG. 7 illustrates add block title alias routine 170 in greater detail. As discussed above, it may be desirable to permit an author to embed a block title tag around a section of a document and include an alias identifier that, while not displayed with the document, may be added as an alias whenever the user updates the alias group for a document with the cursor disposed within the section delimited by the block title tags. Therefore, routine 170 begins in block 172 by determining whether the cursor for the document is currently within a block—that is, whether the cursor is between a pair of block title tags. If not, routine 170 is terminated, as this is a condition for adding the block title alias in this implementation of the routine. In the alternative, it may be desirable to permit a user to add block aliases without requiring specific cursor placement within blocks, whereby block 172 may be omitted.

If the cursor is within a block, control is passed to block 174 to extract the text from the block title tag. Next, block 176 is executed to store the text in the block title slot for the alias group data structure. Upon completion of block 176, routine 170 is complete.

Figure 8:
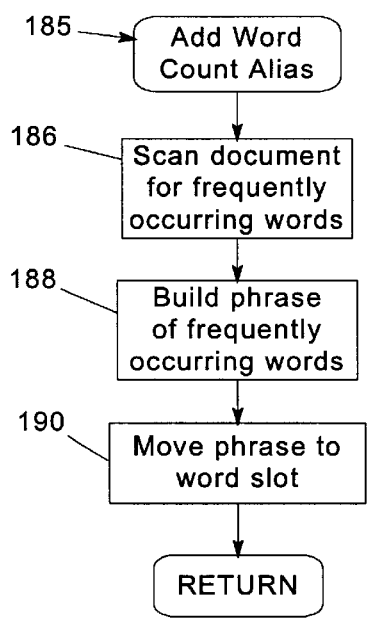
FIG. 8 is a flow chart illustrating the program flow of the add word count alias routine of FIG. 6.

FIG. 8 illustrates add word count alias routine 185 in greater detail. As discussed above, routine 185 scans a document to locate frequently-occurring words that may be useful in identifying the document. In the alternative, it may be a user-selectable option to permit only a portion of a document to be scanned, e.g., in response to a user selecting a block of information from the document prior to an automatic generation operation.

Routine 185 begins in block 186 by scanning the entire document for frequently-occurring words, typically words whose counts exceed a predetermined threshold. It may also be desirable to limit the types of words that are scanned to only include non-common words. This may be performed, for example, by generating a list of words that should be excluded since they do not generate any unique information about a document. Such words may include various pronouns, such as "you" or "I", as well as connectors, articles, prepositions and the like, e.g., "the", "of", etc. Furthermore, it may be desirable to scan for phrases of words in addition to simply words so that frequent phrases may also be used as aliases.

Upon completion of block 186, block 188 is executed to build a phrase including each of the frequently occurring words, and the phrase is then stored in the word phrase slot 88 for the alias group data structure in block 190.

The phrase stored in the alias data structure may include, for example, each frequently-occurring word separated by a comma. Moreover, it may be desirable to perform a sorting operation on the set of words to emphasize some words relative to others, e.g., based upon alphabetical order, rarity of words, frequencies of occurrence, proximity to a start position in the document, proximity to a current position in the document or the frequency of user access to positions of the words in the document (e.g., to emphasize words that are viewed more often by a user), among other criteria. Upon completion of block 190, routine 185 is complete.

Figure 9:
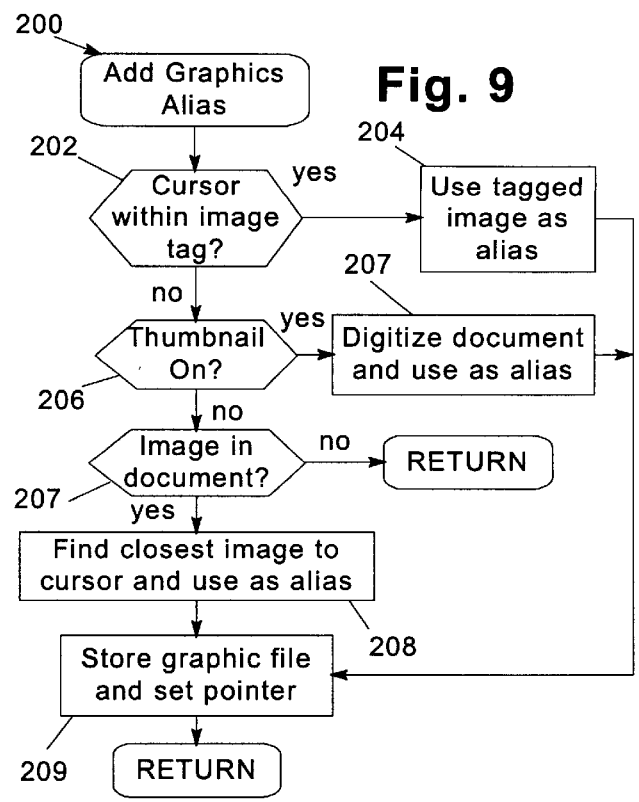
FIG. 9 is a flow chart illustrating the program flow of the add graphics alias routine of FIG. 6.

FIG. 9 illustrates add graphics alias routine 200 in greater detail. Routine 200 permits different graphics aliases to be generated based upon different conditions at the time the refresh routine was initiated. A first condition, detected at block 202, occurs when the cursor is located within an image tag in the document. If so, control is passed to block 204 to utilize that graphic image as an alias. Control is then passed to block 209 to store the image data from the tagged image in a file and set the pointer in the alias group data structure to point to the created graphic file.

Returning to block 202, if the cursor is not within an image tag, a second condition is tested in block 206—that of determining whether a thumbnail option has been enabled. If it has, block 207 is executed to digitize the document to obtain a "snapshot" of the rendered document and use such digitized representation as the alias. Block 207 then passes control to block 209 to store the digitized image in a graphic file and set the pointer in the alias group data structure to point to this file.

Returning to block 206, if the thumbnail option is not enabled, a default image is utilized, if possible, by executing block 207 to determine if a graphic image exists in the document. If no image exists, routine 200 is terminated. If an image does exist, control is passed to block 208 to locate the closest image in the document to the location of the cursor. Upon completion of block 208, block 209 is executed to store the image data in a file and set the pointer in the alias group data structure to point to the file. Upon completion of block 209, routine 200 is terminated.

It should be appreciated that block 209 may optionally reduce, enlarge, or otherwise manipulate image data to a standard image size so that a standard thumbnail-size image is displayed as the graphic alias for the alias group. Moreover, various compression algorithms and caching mechanisms may be used to reduce the storage requirements for the image files. For example, it may be desirable to define a set of icons that classify different alias groups into one of several categories. In such an instance, different alias groups may share the same icon by pointing to the same image file.

It should also be appreciated that other multimedia objects may be utilized as aliases, e.g., animation clips, audio clips, video clips, three-dimensional images and worlds, etc. The automatic generation of aliases based upon such objects would proceed in a similar manner to routine 200.

Also, in such instances, it may be desirable to represent an object by a graphical control such as an icon or button that a user may access to activate the object. Upon selection of the control, the multimedia object would be activated and presented to the user. For instance, for an animation clip, audio clip or video clip, a unique icon button may be displayed and selected by a user to open the particular media player application that would present the multimedia object to the user. In the alternative, it may be suitable in some applications to constantly display the multimedia object as an alias. For example, an animation clip for each alias group could be constantly displayed alongside each alias group selection in menu 50 (FIG. 3). In addition, it should be appreciated that multimedia objects may be activated in other circumstances, e.g., when a user places focus on a particular alias selection. For example, it may be desirable to play an audio clip whenever a particular alias selection is highlighted. Other modifications will be apparent to one of ordinary skill in the art.

Figure 10:
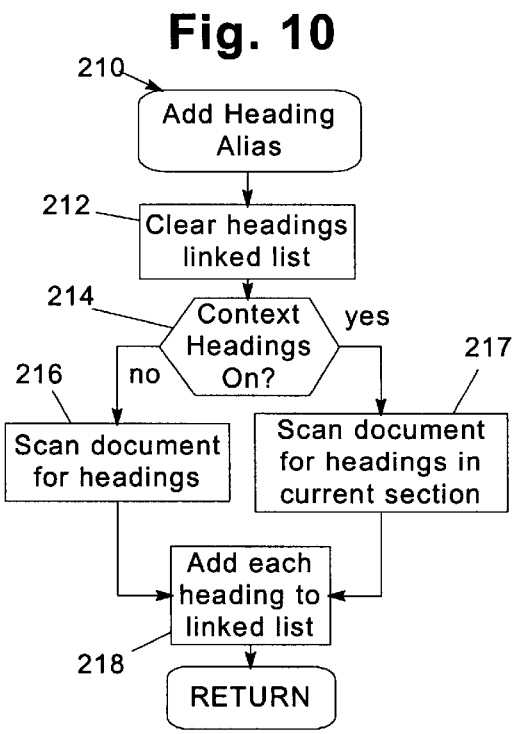
FIG. 10 is a flow chart illustrating the program flow of the add heading alias routine of FIG. 6.

FIG. 10 illustrates add heading alias routine 210 in greater detail. Routine 210 begins in block 212 by clearing the headings linked list. Next, block 214 determines whether a context headings option is enabled. If not, control passes to block 216 to scan the document for headings. If the context headings option is enabled, block 217 is executed to scan only headings in a current section of the document, e.g., between predetermined section breaks in the document. Upon completion of either block 216 or 217, such headings are then added to the linked list in block 218, whereby routine 210 is then complete.

Typically, headings are identified using conventional HTML tags that are well-known in the art. In the alternative, it may also be desirable to utilize additional scanning algorithms to identify headings that are not specifically delineated as such. For example, many HTML documents include tables of contents that are comprised of hypertext links pointing to other documents or to other locations within the same document. As such, it may be desirable to scan for such hypertext links to generate additional headings for the document.

As an example of the automatic generation of aliases for a document, Table I below provides an example HTML document from which an alias group such as the alias group represented by selection 65 in FIG. 3 may be automatically generated:

TABLE I

Example HTML Document

| | |
|---|---|
| 1 | <html> |
| 2 | <title>IBM</title> |
| 3 | <body> |
| 4 | <p><img src ="computer.gif"> |
| 5 | <h1 >Introduction</h1> |
| 6 | IBM manufactures and sells a wide variety of E-business products, as well as provides E-business solutionsfor growing enterprises. |
| 7 | <h1>Computer Hardware</h1> |
|   | * |
|   | * |
|   | * |
| 8 | <h1>Computer Software</h1> |
|   | * |
|   | * |
|   | * |
| 9 | </body> |
| 10 | </html> |

Assuming that all auto-generation options are enabled, it should be appreciated that routine 150 will generate a title-type alias in block 158 based upon the title tag in line 2 of the example document, resulting in the creation of alias 70 (FIG. 3). In addition, a word count scan of the document, e.g., with a threshold of two, will generate a list of words including the words "E-business" and "Computer", forming an alias 72 (FIG. 3). Moreover, with the thumbnail option disabled, routine 150 will add graphic alias 66 (FIG. 3) based upon the image tag at line 4 of the example document. Furthermore, with the auto-headings option enabled, three heading-type aliases 74 will be generated based upon the heading tags found at lines 5, 7 and 8 of the example document.

Turning now to FIG. 11, manually update alias routine 220 is illustrated in greater detail. Routine 220 permits a manual update to be performed either fully manually or semi-automatically, based upon a semi-automatic option which may be configured by a user. If this option is not enabled, block 221 passes control to block 222 to display the alias group in its entirety. Next, block 224 is executed to receive user input to modify individual aliases displayed within the group (e.g., using a plurality of edit box controls, among other alternatives). Based upon this user input, block 226 is executed to update the alias group data structure based upon any modifications made to the aliases therein. Routine 220 is then complete.

Returning to block 221, if a semi-automatic option is enabled, block 228 is executed to permit the user to select text within the document from which the alias group will be updated. Next, routine 150 is called using the selected text to update the alias group in the manner described above. After the alias group has been refreshed, routine 220 is then complete. Another option (not shown) is to permit a user to request an update of an alias group without any particular text selected, but with the document reloaded prior to the refresh operation. Also, it may be desirable to permit a user to select text to be used as a separate alias (e.g., having its own slot or replacing the primary title alias), or to be appended to the end of the primary title alias.

FIG. 12 illustrates update aliases routine 230 in greater detail. Routine 230 begins in block 232 by selecting the first alias group data structure in the alias list data structure. Next, block 234 initiates a WHILE loop that executes until all alias groups in the list have been processed. For each such alias group, block 236 is executed to obtain the next alias group in the list. This alias group is then refreshed by calling routine 150. After all alias groups have been processed, routine 230 is complete.

FIG. 13 illustrates set alias options routine 240 in greater detail. As discussed above, a number of options, including auto-generation of block titles, comment tags, ATitle alias tags, word-type aliases, graphics-type aliases and headings-type aliases may be configured by a user. Moreover, other options such as the semi-automatic update option, the context headings option, the thumbnail option, etc. may also be configurable by a user. Accordingly, routine 240 begins in block 242 by opening an appropriate update options panel (e.g., a dialog box) which provides suitable check boxes or other controls that permit a user to configure the browser as he or she sees fit. It should also be appreciated that other options, such as sorting and other parameters for the various scanning operations for the word and headings-type alias generations routines may also be set in this block.

Another option that may be configured by a user is an auto-refresh option, which is used to refresh the alias groups in the background on a periodic basis. As such, upon receipt of user input from the update options panel (which typically occurs, for example, when an "OK" button is selected), block 244 is executed to determine whether the auto-refresh option has been enabled. If it has, block 246 determines whether a refresh thread currently exists—that is, whether the auto-refresh option was already enabled. If no refresh thread exists, control is passed to block 250 to start a refresh thread, including passing the refresh thread a refresh time that determines how often the alias groups should be refreshed on an automatic basis. Since a refresh operation on the alias groups occupies both processor time as well as network time in retrieving the documents for the auto-generation of aliases, the refresh time should be selected to balance timely updates to the aliases with bandwidth requirements.

Returning to block 246, if a refresh thread currently exists, the thread must be killed (as shown in block 248) prior to starting a new refresh thread. After a new thread is started, control is passed to block 252 to set the various option flags as specified in the panel, and thereafter the panel is closed, and routine 240 terminates.

Returning to block 244, if the auto-refresh option is not enabled, control is passed to block 251 to kill any existing refresh threads. Control is then passed to block 252 to set the flags and terminate the routine.

FIG. 14 illustrates a suitable refresh thread 255 that is started by block 250 of routine 240. Each refresh thread operates in much the same manner as update aliases routine 230. Specifically, the alias list is reset in block 256, and a loop is initiated in block 258 to process each alias group in the list. Block 258 calls block 260 to retrieve the next alias group in the list, and then to call refresh alias routine 150 to refresh such alias group. Once each alias group has been processed, block 258 passes control to block 262 to wait the refresh amount of time prior to passing control to block 256 to reset the alias list and again update the alias groups in the list. Thread 255 therefore executes continuously until such time as it is killed.

Various additional modifications may be made consistent with the invention. For example, instead of or in addition to providing a user with the ability to modify the current alias displayed in menu 50 for an alias group, a user may be able to modify the current alias displayed for each alias group in menu 50 at once so that all selections are modified concurrently. For example, a user may wish for menu 50 to display the word or a first heading alias for each alias group at once. In addition, it is possible for type-specific alias tables to be presented to a user, e.g., a graphics-only alias table, a heading-only alias table, or a word-only alias table.

The placement of aliases within linked lists may also be modified based on different predetermined ordering criteria. For example, for word-type aliases, words may be weighted on different criteria, e.g., the nearness of each word to the top of the document, a weighting factor based upon the words being browsed when the user initiates an add alias group event, a weighting factor for sections of a document that are browsed most frequently, or a weighting factor for the number of occurrences of a word, among others. In addition, similar weighting criteria may be used for graphics and other types of aliases, e.g. based upon nearness to the top of the document, frequency of occurrence or size (amount of data) or other mechanisms.

It should also be appreciated that various alias management techniques may also be utilized, e.g., permitting a user to copy, delete or otherwise modify alias lists. In addition, access and security controls may be utilized to protect viewing, access and/or modification of aliases by specific users. In addition, while a user may be locked-out of modifying a system-generated alias list, it may be desirable to permit the user to copy the system-generated list and permit the user to freely modify the copied list.

It may also be desirable to permit a user to update all of the alias groups, or only a subset of the alias groups, as desired.

It may also be desirable, based upon storage limitations, to set a maximum data size for alias groups or the aliases stored therein. Moreover, graphic data may be filtered or otherwise compressed to minimize storage requirements for an alias list.

It should be appreciated that the given the wide variety of user interface mechanisms and controls available in GUI as well as other user interface environments, the specific mechanisms and controls utilized in the preferred embodiments to manipulate and otherwise manage aliases are merely exemplary in nature. Moreover, various additional modifications may be made to the above-described embodiments without departing from the spirit and scope of the invention. Therefore, the invention lies solely in the claims hereinafter appended.

What is claimed is:

1. A browser application computer program product for browsing the Internet, said program product including a plurality of computer-executable instructions embodied in signal-bearing media, wherein said computer-executable instructions cause a computer to perform the steps of:
(a) retrieving at least a portion of a document from a web server attached to the Internet, said document having a universal identifier;
(b) automatically selectively extracting content data from said at least a portion of a document, said selectively extracted content data including at least some data other than a title for the document, said selectively extracted content data representing less than all of the document,
(c) automatically generating an alias for the universal identifier of said document based upon the content data retrieved and selectively extracted from the document;
(d) saving said alias with said universal identifier in a bookmark list, said bookmark list containing a plurality of user-selectable entries, each entry associating) an alias with a corresponding universal identifier;
(e) displaying aliases of said user-selectable entries of said bookmark list to a user; and
(f) responsive to a user selection of a displayed alias, retrieving a document identified by the corresponding universal identifier.

2. The browser application computer program product of claim 1, wherein said step of selectively extracting content data includes generating, a set of frequently-occurring words from the content data, and wherein the alias includes at least one word from the set of frequently-occurring words.

3. The browser application computer program product of claim 1, wherein the document is an HTML document, and wherein said step of selectively extracting content data includes scanning the content data for an alternative alias tag identifying an alternative alias, said alternative alias being different from a document title contained within a title tag, and wherein the step of generating an alias generates the alias as an alias identifier identified by the alternative alias tag.

4. The browser application program product of claim 3, wherein the alternative alias tag is a comment tag identifying content data which is not displayed with the document.

5. The browser application program product of claim 3, wherein the alternative alias tag is a bracket tag identifying content data which is displayed with the document.

6. The browser application program product of claim 1, wherein the step of selectively extracting content data includes generating a set of heading from the content data, and wherein the alias includes at least one heading from the set of headings.

7. The browser application program product of claim 1, wherein each bookmark entry associates a set of one or more aliases with each respective corresponding universal identifier, wherein for at least some bookmark entries, the set of aliases comprises a plurality of aliases, at least one alias of each respective plurality of aliases being generated by said generating step.

8. The browser application program product of claim 7, wherein said computer-executable instructions cause a computer to further perform the step of:
displaying all aliases of a set of aliases corresponding to a universal identifier, responsive to a user selection.

9. The browser application program product of claim 7, wherein each set of aliases comprises aliases of a plurality of types, and wherein said computer-executable instructions cause a computer to further perform the steps of:
receiving a user selection of preferred type of alias for display; and
responsive to said user selection of a preferred type of alias, displaying aliases of said preferred type.

10. A method for browsing the Internet, comprising the steps of:
(a) retrieving at least a portion of a document from a web server attached to the Internet, said document having a universal identifier;
(b) automatically selectively extracting content data from said at least a portion of a document, said selectively extracted content data including at least some data other than a title for the document. said selectively extracted content data representing less than all of the document;
(c) automatically generating an alias for the universal identifier of said document based upon the content data retrieved and selectively extracted from the document;
(d) saving said alias with said universal identifier in a bookmark list, said bookmark list containing a plurality of user-selectable entries, each entry associating an alias with a corresponding universal identifier;
(e) displaying aliases of said user-selectable entries of said bookmark list to a user; and
(f) responsive to a user selection of a displayed alias, retrieving a document identified by the corresponding universal identifier.

11. The method for browsing the Internet of claim 10, wherein said step of selectively extracting content data includes generating a set of frequently-occurring words from the content data, and wherein the alias includes at least one word from the set of frequently-occurring words.

12. The method for browsing the Internet of claim 11, wherein generating the alias further includes ordering the set of frequently-occurring words based upon a predetermined ordering criteria.

13. The method for browsing the Internet of claim 12, wherein the predetermined ordering criteria is selected from the group consisting of number of occurrences, proximity to a start position in the document, proximity to a current position in the document, frequency of access for a position of a word in the document, and combinations thereof.

14. The method for browsing the Internet of claim 10, wherein the document is an HTML document, and wherein said step of selectively extracting content data includes scanning the content data for an alternative alias tag identifying an alternative alias, said alternative alias being different from a document title contained within a title tag, and wherein the step of generating an alias generates the alias as an alias identifier identified by the alternative alias tag.

15. The method for browsing the Internet of claim 14, wherein the alternative alias tag is a comment tag identifying content data which is not displayed with the document.

16. The method for browsing the Internet of claim 14, wherein the alternative alias tag is a bracket tag identifying content data which is displayed with the document.

17. The method for browsing the Internet of claim 10, wherein the step of selectively extracting content data includes generating a set of heading from the content data, and wherein the alias includes at least one heading from the set of headings.

18. The method for browsing the Internet of claim 10, further comprising the step of:
refreshing the alias based upon updated content data for the document.

19. The method for browsing the Internet of claim 10, wherein each bookmark entry associates a set of one or more aliases with each respective corresponding universal identifier, wherein for at least some bookmark entries, the set of aliases comprises a plurality of aliases, at least one alias of each respective plurality of aliases being generated by said generating step.

20. The method for browsing the Internet of 19, further comprising the step of:

displaying all aliases of a set of aliases corresponding to a universal identifier, responsive to a user selection.

21. The method for browsing the Internet of claim 19, wherein each set of aliases comprises aliases of a plurality of types, and wherein said method further comprises the steps of:

receiving a user selection of preferred type of alias for display; and responsive to said user selection of a preferred type of alias, displaying aliases of said preferred type.

\* \* \* \* \*